US009869156B2

(12) United States Patent
Reddy et al.

(10) Patent No.: US 9,869,156 B2
(45) Date of Patent: Jan. 16, 2018

(54) GELLABLE TREATMENT FLUIDS WITH CLAY-BASED GEL RETARDERS AND RELATED METHODS

(71) Applicant: Halliburton Energy Services, Inc., Houston, TX (US)

(72) Inventors: B. Raghava Reddy, The Woodlands, TX (US); Larry Eoff, Duncan, OK (US); Natalie Pascarella, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 308 days.

(21) Appl. No.: 14/380,281

(22) PCT Filed: Oct. 22, 2013

(86) PCT No.: PCT/US2013/066100
§ 371 (c)(1),
(2) Date: Aug. 21, 2014

(87) PCT Pub. No.: WO2015/060823
PCT Pub. Date: Apr. 30, 2015

(65) Prior Publication Data
US 2016/0230072 A1    Aug. 11, 2016

(51) Int. Cl.
*E21B 33/138*    (2006.01)
*E21B 43/04*    (2006.01)
(Continued)

(52) U.S. Cl.
CPC ........... *E21B 33/138* (2013.01); *C09K 8/24* (2013.01); *C09K 8/512* (2013.01); *E21B 43/04* (2013.01); *E21B 43/16* (2013.01); *C09K 2208/10* (2013.01)

(58) Field of Classification Search
None
See application file for complete search history.

(56) References Cited

U.S. PATENT DOCUMENTS 4,004,639 A * 1/1977 Sandiford ............ C09K 8/5045
166/270
5,423,380 A * 6/1995 Johnston ................ C09K 8/512
166/294
(Continued)

FOREIGN PATENT DOCUMENTS

WO    2015060823 A1    4/2015

OTHER PUBLICATIONS

Blanton et al.; Microstructure of Clay-Polymer Composites; 2000; JCPDS—International Center for Diffraction Data; Advances in X-ray Analysis; vol. 42; pp. 562-568.*

(Continued)

*Primary Examiner* — Anuradha Ahuja
(74) *Attorney, Agent, or Firm* — McDermott Will & Emery LLP

(57) ABSTRACT

Clay-based retarders may be useful in delaying the gel time of a gellable treatment fluid and, consequently, subterranean operations. For example, a method may involve providing a gellable treatment fluid comprising: an aqueous base fluid; a base polymer comprising an acrylamide monomer unit; a polymeric organic crosslinking agent comprising a crosslinkable polymer selected from the group consisting of polyethyleneimine, polyvinylamine, chitosan, any derivative thereof, any salt thereof, and any combination thereof; and a clay-based gel retarder; introducing the gellable treatment fluid into a wellbore penetrating a subterranean formation; and forming a gel with the gellable treatment fluid in at least a portion of the wellbore, at least a portion of the subterranean formation, or both. In some instances, producing the gellable treatment fluid may involve not pre-hydrat-
(Continued)

ing the clay-based gel retarder. In some instances, the gellable treatment fluid may not be thixotropic or pseudoplastic before introduction into the wellbore.

15 Claims, 5 Drawing Sheets

(51) Int. Cl.
*E21B 43/16* (2006.01)
*C09K 8/512* (2006.01)
*C09K 8/24* (2006.01)

(56) References Cited

U.S. PATENT DOCUMENTS

| | | | | |
|---|---|---|---|---|
| 5,849,674 | A * | 12/1998 | Fox | C09K 8/206 |
| | | | | 166/295 |
| 5,880,197 | A * | 3/1999 | Beall | C01B 33/44 |
| | | | | 428/331 |
| 6,024,170 | A | 2/2000 | McCabe et al. | |
| 6,172,121 | B1 * | 1/2001 | Chaiko | B01J 13/0078 |
| | | | | 106/487 |
| 6,262,162 | B1 * | 7/2001 | Lan | C01B 33/44 |
| | | | | 428/333 |
| 6,777,377 | B2 | 8/2004 | Myers et al. | |
| 6,823,939 | B2 * | 11/2004 | Bouwmeester | C09K 8/5045 |
| | | | | 166/270 |
| 7,350,574 | B2 | 4/2008 | Santra et al. | |
| 8,343,896 | B2 | 1/2013 | Eoff et al. | |
| 2002/0037822 | A1 * | 3/2002 | Foley | C11D 3/30 |
| | | | | 510/218 |
| 2003/0213593 | A1 | 11/2003 | Bouwmeester et al. | |
| 2006/0234871 | A1 * | 10/2006 | Dalrymple | C09K 8/428 |
| | | | | 507/211 |
| 2010/0016183 | A1 * | 1/2010 | Roddy | C04B 20/10 |
| | | | | 507/225 |
| 2011/0114318 | A1 * | 5/2011 | Ezell | C09K 8/5045 |
| | | | | 166/305.1 |
| 2011/0180259 | A1 * | 7/2011 | Willberg | C09K 8/68 |
| | | | | 166/280.2 |
| 2011/0237465 | A1 * | 9/2011 | Lee | C09K 8/516 |
| | | | | 507/110 |
| 2013/0000905 | A1 | 1/2013 | Reddy et al. | |
| 2014/0090843 | A1 * | 4/2014 | Boul | C04B 28/18 |
| | | | | 166/293 |

OTHER PUBLICATIONS

International Search Report and Written Opinion for PCT/US2013/66100 dated Jul. 25, 2014.

* cited by examiner

GELLABLE TREATMENT FLUIDS WITH CLAY-BASED GEL RETARDERS AND RELATED METHODS

BACKGROUND

The exemplary embodiments described herein relate to clay-based gel retarders, including related methods and compositions.

Water often undesirably accompanies the production of oil and gas from a well penetrating a subterranean formation. The unwanted production of water from hydrocarbon-producing wells can constitute a considerable technical problem and expense in oilfield operations because the water must be separated before the hydrocarbons can be refined or used. If the ratio of produced-water to produced-hydrocarbon becomes sufficiently large, the cost of separating the water and disposing of it can become a barrier to continued production. This can lead to abandonment of a well penetrating a subterranean formation, even when significant amounts of hydrocarbons remain therein.

One way in which the foregoing problems can be addressed is through conformance control treatments, whereby water-producing zones become fully or partially blocked to fluid flow. Conformance control treatments can involve introducing gellable treatment fluids into a subterranean formation where a gel can form by crosslinking a water-soluble polymer using a crosslinking agent. The gel-time and the gel strength are among the factors that can determine the effectiveness of a conformance control treatment. For example, if the gel-time is too short, introduction or placement of the gellable polymer system into a subterranean formation can prove problematic. Conversely, if the gel-time is too long, the gellable polymer system may not form a gel in the desired portion of the subterranean formation, or long waiting periods may be required before further operations can be carried out. In some instances, to control the gel-time, gel-time accelerators or gel-time retarders are used which are believed to function via chemical interactions with the components of the gellable polymer system.

In many instances, the chemicals in gel-time retarders remain with the gel and over time can hydrolyze the gel, thereby weakening the gel. This may lead to the gel breaking down and resumption of water production. Accordingly, the purity and value of the produced hydrocarbons is diminished, and another conformance control treatment may be needed, both of which increase the cost of hydrocarbon production.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
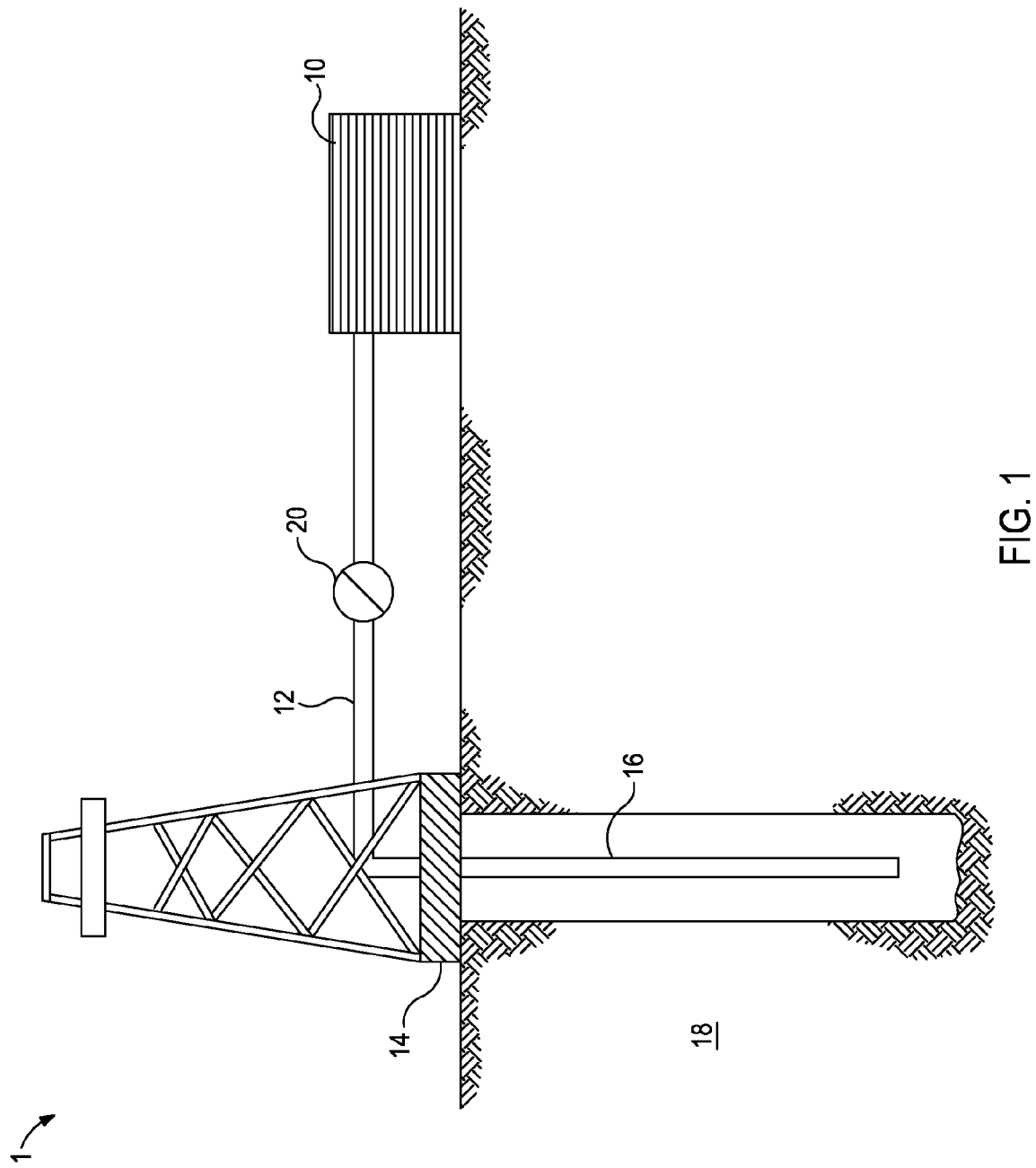
FIG. 1 shows an illustrative schematic of a system that can deliver gellable treatment fluids described herein to a downhole location, according to one or more embodiments.

The exemplary embodiments described herein relate to clay-based gel retarders, including related methods and compositions.

Without being limited by theory, it is believed that the clay-based gel retarders described herein do not extend the gel-time of a gelled treatment fluid by participating in chemical reactions, but rather by an adsorption/desorption mechanism. That is, it is believed that the polar/charged surfaces of the clay-based gel retarders adsorb polar polymers (e.g., via hydrogen bonding, ionic-dipole, ionic-ionic, or dipole-dipole interactions) at low temperatures. Then, at the elevated temperatures within a subterranean formation, the polar/charged polymers may desorb and become available for the crosslinking reaction in the gelation reactions. Because the clay-based gel retarders perform via this adsorption/desorption mechanism, a physical interaction, it is believed that they will minimally impact gel strength minimally, if at all. Therefore, additional, costly conformance control treatments may not be needed.

The ability to use clays as gel retarders is quite surprising as clays typically impart a thixotropic characteristic or behavior to a fluid, and disclosures that include further polymers and crosslinkers provide the same indications. Further, the gellable treatment fluid described herein, in some instances, are not thixotropic or pseudoplastic before introduction into the wellbore. The gel retardation property of the clays as described herein is an unexpected property of the clays and provides for new applications in oil and gas exploration and production.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

In some embodiments, a gellable treatment fluid described herein may comprise an aqueous base fluid, a base polymer, a polymeric organic crosslinking agent, and a clay-based gel retarder.

Aqueous base fluids suitable for use in the gellable treatment fluids described herein may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the gellable treatment fluid described herein. In certain embodiments, the density of the aqueous base fluid can be adjusted, among other purposes, to provide additional particulate transport and suspension in the treatment fluids used in the methods of the embodiments of the present invention. In certain embodiments, the pH of the aqueous base fluid may be adjusted (e.g., by a buffer or other pH adjusting agent), among other purposes, to activate or deactivate a crosslinking agent and/or to modify the viscosity of the first treatment fluid. In these embodiments, the pH may be adjusted to a specific level, which may depend on, among other factors, the types of gelling agents, crosslinkers, and other additives included in the treatment fluid. One of ordinary skill in the art, with the benefit of this disclosure, will recognize when such density and/or pH adjustments are appropriate. In some embodiments, the pH range may preferably be from about 4 to about 11.

In some embodiments, the base polymers suitable for use in the gellable treatment fluids described herein may comprise an acrylamide monomer unit. In some embodiments, suitable base polymers may comprise a partially hydrolyzed polyacrylamide. In some embodiments, suitable base polymers may comprise a copolymer of acrylamide and t-butyl acrylate.

In some embodiments, the base polymer may be present in the gellable treatment fluid in an amount ranging from about 0.1%, 1%, or 2% to about 10%, 7%, or 5% by weight of the aqueous base fluid, and wherein the amount of base polymer may range from any lower limit to any upper limit and encompasses any subset therebetween.

In some embodiments, the polymeric organic crosslinking agent suitable for use in the gellable treatment fluids described herein may comprise a crosslinkable polymer selected from the group of polyethyleneimine, polyvinylamine, chitosan, any derivative thereof, any salt thereof, and any combination thereof.

In some embodiments, the polymeric organic crosslinking agent may be present in the gellable treatment fluid in an amount ranging from about 0.1%, 1%, or 2% to about 5%, 4%, or 3% by weight of the aqueous base fluid, and wherein the amount of polymeric organic crosslinking agent may range from any lower limit to any upper limit and encompasses any subset therebetween.

In some embodiments, the weight ratio of the base polymer to the polymeric organic crosslinking agent in the gellable treatment fluid may range from about 1:2, 1:1, 2:1, or 5:1 to about 50:1, 25:1, or 10:1, and wherein the weight ratio may range from any lower limit to any upper limit and encompasses any subset therebetween.

The clay-based gel retarders suitable for use in the gellable treatment fluids described herein should increase the gel-time of the gellable treatment fluid relative to a comparable gellable treatment fluid without the clay-based gel retarder. As used herein, a "comparable" composition (e.g., gellable treatment fluid) refers to a composition (e.g., gellable treatment fluid) that is the same in every way except the variation that is specifically described.

The clay-based gel retarders described herein may, in some embodiments, comprise exfoliated clay platelets, aggregates of clay platelets, or a combination thereof. These clay platelets may be sourced from hectorite clays, smectite clays, or a combination thereof. Hectorites, natural or synthetic, are layered silicate clays, and smectites are layered aluminosilicate minerals. These clays swell and defoliate in water, thereby increasing the viscosity of water. Examples of hectorite clays suitable for use in the gellable treatment fluids described herein may include, but are not limited to, laponite (lithium magnesium sodium silicates), modified laponites (e.g., lithium magnesium sodium fluorosilicates), synthetic hectorites, and natural hectorites, and any combination thereof. Examples of smectite clays suitable for use in the gellable treatment fluids described herein may include, but are not limited to, montmorillonite (bentonite) and sapiolite. Combinations of the foregoing may be suitable for use in some embodiments described herein.

In some embodiments, the clay-based gel retarders described herein may comprise exfoliated clay platelets having an average diameter of about 10 nm to about 2000 nm and an average thickness of about 0.5 nm to about 2 nm (including subsets of either range). In some embodiments, the clay-based gel retarders described herein may comprise aggregates of clay platelets having an average diameter of about 100 nm to about 3 microns. As used herein, the term "average diameter" refers to a d50 by volume. As used herein, the term "d50" refers to a diameter of which 50% of the particles in the sample are smaller. In some embodiments, the hectorite clay platelets may have an average diameter of about 10 nm to about 50 nm and an average thickness of about 0.5 nm to about 2 nm. In some embodiments, the smectite clay platelets may have a diameter of about 500 nm to about 2000 nm and an average thickness of about 0.5 nm to about 2 nm.

In some embodiments, the aspect ratio (diameter/thickness ratio) of the clay platelets of the clay-based gel retarder may be about 5 to about 4000. In some embodiments, the aspect ratios of hectorite clay platelets may be about 5 to about 100, and the aspect ratios of the smectite clay platelets may be about 1000 to about 4000.

Clay platelets having a small average diameter and small average thickness may advantageously be able to infiltrate portions of the porous matrix of the subterranean formation having smaller pore sizes and interstices, so as to minimally affect their efficacy. In some instances, the gellable treatment fluid described herein may infiltrate a porous matrix having a pore size ranging from about 1 nm, 10 nm, or 100 nm to about 5000 nm, 1000 nm, 500 nm, or 100 nm, and wherein the pore size of the porous matrix may range from any lower limit to any upper limit and encompasses any subset therebetween.

In some instances, the platelet sizes may be sufficiently large to minimally, if at all, infiltrate the smaller pore sizes or interstices of the subterranean matrix. In such instances, the gellable treatment fluids may be used to seal perforations and fractures fluidly connected to the wellbore (e.g., perforations and fractures in a thief zone). In some instances, after incorporating the gelled treatment fluid into the perforations and fracture, the ungelled treatment fluid may be substantially removed from the wellbore with a displacement fluid, thereby plugging the thief zone and allowing fluid flow within the wellbore.

In some embodiments, the clay-based gel retarders may comprise exfoliated clay platelets and/or aggregates of clay platelets wherein the clay platelets have been treated with the surface activity modifier (also referred to herein as "surface treated platelets" or "surface treated clays"). As used herein, the term "surface activity modifier" refers to a chemical absorbed or bound to a surface that changes the net charge of the surface. As defined herein, the surface refers to the edge of the platelet, face of the platelet, or both.

Surface activity modifiers may be anionic or nonionic organic or inorganic compounds. Generally, organic cationic compounds are not suitable for use as surface activity modifiers relative to the embodiments described herein. Examples of surface activity modifiers may include, but are not limited to, sodium carbonate, sodium silicate, alkaline lignosulfates, polyphosphates, tripolyphosphates, hexametaphosphate, amino alkylene phosphonates, polyethylene glycol, propylene carbonate, and the like, and any combination thereof. Generally, the surface treated platelets remain hydrophilic and available to adsorption by the polymeric organic crosslinking agent, the base polymer, or both. In some embodiments, the surface activity modifier may be present in an amount of about 0.02% to about 5% by weight of the clay-based gel retarder.

Without being limited by theory, it is believed that the surface treated clays may allow for higher concentrations of the clay-based gel retarders without significantly increasing the viscosity of the gellable treatment fluid. Such high concentrations of clay-based gel retarders may advantageously extend the gel time at high temperatures.

Further, in some instances, surface treated clays may yield gellable treatment fluids that are pumpable even with high concentrations of the gellable treatment fluids. That is, surface treated clays may form thin solutions (also referred to as "sols"). For example, 1% by weight (equivalent to 120 pounds clay retarder per 1000 gallons water) of a pre-hydrated, swollen clay may yield a viscous gel in water at room temperature, whereas surface treated clays may yield low viscosity sols at concentrations of about 5% to about 25% by weight of the gelled treatment fluid. The higher viscosity gel would require higher pressures and pump rates when introduced into the wellbore, whereas the gellable fluid described herein, at higher clay concentrations, may be more easily placed in the subterranean formation.

In some embodiments when surface treated clays are used, the gelled treatment fluid may also optionally comprise a clay-activator. As used herein, the term "clay-activator" refers to a compound that reacts with the surface activity modifiers or the clay surface to remove the surface activity modifier from the surface, thereby regenerating at least a portion of the clay surface to the untreated form. The use of a clay-activator may allow for further controlling the gel times of the gellable treatment fluid. Clay-activators may include compounds that deactivate the surface activity modifiers by precipitation, neutralization, chelate/complex formation, or a combination thereof. An example of clay-activators suitable for use in conjunction with a polyphosphate surface activity modifier (e.g., a tripolyphosphate or pyrophosphate compound) are calcium carbonate and soluble calcium salts (e.g., calcium chloride or calcium sulfate).

In some embodiments, the clay-based gel retarders (surface treated or otherwise) may be present in the gellable treatment fluid in an amount ranging from about 0.1%, 1%, or 3% to about 15%, 10%, or 5% by weight of the aqueous base fluid, and wherein the amount of the clay-based gel retarders may range from any lower limit to any upper limit and encompasses any subset therebetween. In some embodiments, the clay-based gel retarders (surface treated or otherwise) may be used as liquid concentrate (e.g., the clay suspended in water, a water-miscible, non-aqueous polar solvent (for example, ethylene glycol, propylene glycols), or a combination thereof). In some embodiments, the clay-based gel retarders (surface treated or otherwise) may be used as a dry additive.

Some embodiments may involve preparing a gellable treatment fluid described herein. In some embodiments, the clay-based gel retarders are used in aggregate form without defoliating to exfoliated clay platelets by hydration prior to use (e.g., used without the initial defoliating pre-hydration step). In such instances, the base polymer, the polymeric organic crosslinking agent, and the clay-based gel retarders are concurrently added to the aqueous base fluid. As used herein, the terms "concurrently adding," "concurrently combining," and the like refer to adding or combining two or more materials at substantially the same time (e.g., simultaneously or in series with little to no delay between additions). As used herein, the term "defoliation" (also referred to as delamination) refers to a spatially separating of the clay platelets within an aggregate from each other and dispersing the separated clay platelets in the fluid.

Without being limited by theory, it is believed that by using the clays in aggregate form (e.g., not pre-hydrated), a polymer-intercalated product (also referred to as an intercalated aggregate) is formed where the base polymer and the polymeric organic crosslinking agent insert into the spacing (also called gallery) between the platelets in an aggregated clay particle wherein polymer chains are flanked by two platelets. Then, the intercalated aggregates disperse over an extended period of time to defoliated plates with the base polymer and the polymeric organic crosslinking agent adsorbed thereto. Because the clay-based gel retarders described herein are, in some instances, effective without pre-hydration, the time and cost associated with a pre-hydration step of clays may be eliminated.

Treating the clays with the surface activity modifiers may occur at any suitable point relative to the mixing or production of the gellable treatment fluid. Some embodiments may involve treating the clay surface to yield surface treated clays, then mixing the aqueous base fluid, the surface treated clays, the base polymer, and the polymeric organic crosslinking agent to yield a gellable treatment fluid. Some embodiments may involve mixing the aqueous base fluid, the clay-based gel retarder, surface activity modifiers, the base polymer, and the polymeric organic crosslinking agent to yield a gellable treatment fluid. In such instances, the clays may be surface modified while forming intercalated aggregate. Some embodiments may involve mixing the aqueous base fluid, the clay-based gel retarder, the base polymer, and the polymeric organic crosslinking agent to yield a gellable treatment fluid, then adding surface activity modifiers to the gellable treatment fluid.

In some embodiments, the gellable treatment fluids, prior to introduction into wellbore, are not thixotropic or pseudoplastic fluids.

The gellable treatment fluids described herein may be used for treating, sealing, or otherwise reducing the fluid flow through at least a portion of the wellbore, at least a portion of the subterranean formation, or both. Such location may, for example, include permeable zones of the subterranean formation, water producing zones of the subterranean formation, gravel packs, an annulus within a wellbore (e.g., an annulus between the wellbore and the casing, and an annulus between the casing and a tubular, an annulus between the wellbore and a tubular, and so on), and combinations or hybrids thereof.

Some embodiments may involve mixing or producing a gellable treatment fluid as described herein, introducing the gellable treatment fluid into a wellbore penetrating a subterranean formation, and forming a gel with the gellable treatment fluid in at least a portion of the wellbore, at least a portion of the subterranean formation, or both. In some instances, the gellable treatment fluid may infiltrate a porous matrix of the subterranean formation, and the gel may be formed in the porous matrix. In some instances, the gellable treatment fluid may be placed in fractures and perforations in the subterranean formation that are fluidly connected to the wellbore, and the gel may be formed fractures and perforations in the subterranean formation. In some instances, a combination of the foregoing may be a suitable method for implementing the gellable treatment fluids described herein.

In various embodiments, systems configured for delivering the treatment fluids described herein to a downhole location are described. In various embodiments, the systems can comprise a pump fluidly coupled to a tubular (e.g., penetrating a subterranean formation), the tubular containing a gellable treatment fluid comprising an aqueous base fluid, a base polymer, a polymeric organic crosslinking agent, and a clay-based gel retarder.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the gellable treatment fluid to the high pressure pump. In such embodiments, the low pressure pump may "step up" the pressure of the gellable treatment fluid before it reaches the high pressure pump.

In some embodiments, the systems described herein can further comprise a mixing tank that is upstream of the pump and in which the gellable treatment fluid is formulated. In various embodiments, the pump (e.g., a low pressure pump, a high pressure pump, or a combination thereof) may convey the gellable treatment fluid from the mixing tank or other source of the gellable treatment fluid to the tubular. In other embodiments, however, the gellable treatment fluid can be formulated offsite and transported to a worksite, in which case the gellable treatment fluid may be introduced to the tubular via the pump directly from its shipping container (e.g., a truck, a railcar, a barge, or the like) or from a transport pipeline. In either case, the gellable treatment fluid may be drawn into the pump, elevated to an appropriate pressure, and then introduced into the tubular for delivery downhole.

FIG. 1 shows an illustrative schematic of a system that can deliver gellable treatment fluids described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a gellable treatment fluid described herein may be formulated. The gellable treatment fluid may be conveyed via line 12 to wellhead 14, where the gellable treatment fluid enters tubular 16, tubular 16 extending from wellhead 14 into subterranean formation 18. Upon being ejected from tubular 16, the gellable treatment fluid may subsequently penetrate into subterranean formation 18. Pump 20 may be configured to raise the pressure of the gellable treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the gellable treatment fluid may, in some embodiments, flow back to wellhead 14 and exit subterranean formation 18. In some embodiments, the gellable treatment fluid that has flowed back to wellhead 14 may subsequently be recovered and recirculated to subterranean formation 18.

It is also to be recognized that the disclosed gellable treatment fluids may also directly or indirectly affect the various downhole equipment and tools that may come into contact with the gellable treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that involves providing a gellable treatment fluid comprising: an aqueous base fluid; a base polymer comprising an acrylamide monomer unit; a polymeric organic crosslinking agent comprising a crosslinkable polymer selected from the group consisting of polyethyleneimine, polyvinylamine, chitosan, any derivative thereof, any salt thereof, and any combination thereof; and a clay-based gel retarder; introducing the gellable treatment fluid into a wellbore penetrating a subterranean formation; and forming a gel with the gellable treatment fluid in at least a portion of the wellbore, at least a portion of the subterranean formation, or both;

B. a method that involves providing a gellable treatment fluid comprising: an aqueous base fluid; a base polymer comprising an acrylamide monomer unit; a polymeric organic crosslinking agent comprising a crosslinkable polymer selected from the group consisting of polyethyleneimine, polyvinylamine, chitosan, any derivative thereof, any salt thereof, and any combination thereof; and a clay-based gel retarder that comprises a plurality of clay platelets having an average diameter of about 10 nm to about 100 nm and an average thickness of about 0.5 nm to about 2 nm; introducing the gellable treatment fluid into a wellbore penetrating a subterranean formation, the subterranean formation comprising a porous matrix; infiltrating at least a portion of the porous matrix of the subterranean formation with the gellable treatment fluid; and forming a gel in the porous matrix of the subterranean formation with the gellable treatment fluid; and C. a method that includes concurrently combining an aqueous base fluid, a base polymer, a polymeric organic crosslinking agent, and a clay-based gel retarder in a dry-form, wherein the base polymer comprises an acrylamide monomer unit, wherein the polymeric organic crosslinking agent comprises a crosslinkable polymer selected from the group consisting of polyethyleneimine, polyvinylamine, chitosan, any derivative thereof, any salt thereof, and any combination thereof, and wherein the clay-based gel retarder comprises at least one selected from the group consisting of a laponite, a modified laponite, a natural hectorite, a montmorillonite, a sapiolite, and any combination thereof; introducing the gellable treatment fluid into a wellbore penetrating a subterranean formation; and forming a gel with the gellable treatment fluid in at least a portion of the wellbore, at least a portion of the subterranean formation, or both.

Each of embodiments A, B, and C may have one or more of the following additional elements (unless already provided for) in any combination: Element 1: wherein providing the gellable treatment fluid involves concurrently combining the aqueous base fluid, the base polymer, the polymeric organic crosslinking agent, and the clay-based gel retarder in dry form; Element 2: wherein the gellable treatment fluid is not thixotropic or pseudoplastic before introducing into the wellbore; Element 3: wherein the clay-based gel retarder comprises a plurality of clay platelets having an average diameter of about 10 nm to about 100 nm and an average thickness of about 0.5 nm to about 2 nm; Element 4: wherein the clay-based gel retarder comprises a plurality of exfoliated clay platelets or aggregates of a plurality of clay platelets having an average diameter of about 100 nm to about 2000 nm; Element 5: wherein the clay-based gel retarder comprises synthetic hectorite; Element 6: wherein the clay-based gel retarder comprises at least one selected from the group consisting of a laponite, a modified laponite, a natural hectorite, a montmorillonite, a sapiolite, and any combination thereof; Element 7: wherein the clay-based gel retarder comprises a plurality of clay platelets having been treated with a surface activity modifier; Element 8: wherein the clay-based gel retarder comprises a plurality of clay platelets having been treated with a surface activity modifier, and wherein the gellable treatment fluid further comprises a clay-activator; Element 9: wherein the clay-based gel retarder is present in the gellable treatment fluid in an amount of about 0.1% to about 15% by weight of the aqueous base fluid; Element 10: wherein the base polymer comprises a partially hydrolyzed polyacrylamide; Element 11: wherein the base polymer comprises a copolymer of acrylamide and t-butyl acrylate; Element 12: wherein the base polymer is present in the gellable treatment fluid in an amount of about 0.1% to about 10% by weight of the aqueous base fluid; Element 13: wherein the polymeric organic crosslinking agent is present in the gellable treatment fluid in an amount of about 0.1% to about 5% by weight of the aqueous base fluid; Element 14: wherein the base polymer and the polymeric organic crosslinking agent are at a relative weight ratio of about 1:2 to about 50:1; Element 15: the method further comprising infiltrating a porous matrix of the subterranean formation with at least a portion of the gellable treatment fluid; and forming the gel in at least a portion of the porous matrix of the subterranean formation with the gellable treatment fluid; Element 16: wherein forming the gel is in an annulus within the wellbore; and Element 17: wherein forming the gel is in a gravel pack.

By way of nonlimiting example, exemplary element combinations applicable to A, B, C include: Element 3 in combination with at least one of Elements 5-6; Element 4 in combination with at least one of Elements 5-6; Element 9 in combination with at least one of Elements 5-6 and optionally in combination with one of Elements 3-4; Element 10 in combination with Element 11; Element 10 in combination with Element 12; Element 11 in combination with Element 12; Element 12 in combination with Element 13; Element 10 in combination with Element 14; Element 11 in combination with Element 14; Element 7 or 8 in combination with any of the foregoing; Element 1 in combination with any of the foregoing; Element 2 in combination with any of the foregoing; and at least one of Elements 15-17 in combination with any of the foregoing.

Other embodiments described herein may be a system that comprises a pump fluidly coupled to a tubular that penetrates a subterranean formation, wherein the tubular contains a gellable treatment fluid that comprises an aqueous base fluid; a base polymer comprising an acrylamide monomer unit; a polymeric organic crosslinking agent comprising a crosslinkable polymer selected from the group consisting of polyethyleneimine, polyvinylamine, chitosan, any derivative thereof, any salt thereof, and any combination thereof; and a clay-based gel retarder, wherein the system optionally further comprise components described herein (e.g., a mixing tank and a wellhead). Further, exemplary element combinations applicable to this embodiments may include: Element 3 in combination with at least one of Elements 5-6; Element 4 in combination with at least one of Elements 5-6; Element 9 in combination with at least one of Elements 5-6 and optionally in combination with one of Elements 3-4; Element 10 in combination with Element 11; Element 10 in combination with Element 12; Element 11 in combination with Element 12; Element 12 in combination with Element 13; Element 10 in combination with Element 14; Element 11 in combination with Element 14; and Element 7 or 8 in combination with any of the foregoing.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present invention, the following examples of preferred or representative embodiments are given. In no way should the following examples be read to limit, or to define, the scope of the invention.

EXAMPLES

Example 1

Gel-time measurements at 160° F. (71° C.) were conducted for a mixture of 350 gal/Mgal t-butylacrylate-co-acrylamide and 60 gal/Mgal polyethyleneimine in the presence of a variety of laponite clays: 219 pounds per thousand gallons (pptg) of LAPONITE® RD (a gel forming grade laponite), 72.9 pptg LAPONITE® D (a gel forming grade laponite premixed with a xanthan polymer), 72.9 pptg LAPONITE® RDS (a temporary sol forming grade laponite), 72.9 pptg LAPONITE® S482 (a permanent sol forming grade laponite), 72.9 pptg LAPONITE® SH (a permanent sol forming grade laponite), and 72.9 pptg LAPONITE® RXL 7247 (a laponite premixed with a xanthan polymer), each of which are available from Southern Clay Products, Inc. As used herein, the term "gal/Mgal" refers to gallons per 1000 gallons treatment fluid. As used herein, the term "pptg" refers to pounds per 1000 gallon of treatment fluid. First, the laponite clay was hydrated in fresh water for 30 minutes with stirring. Then, the polymers were added followed by 2% KCl by total weight of the fluid. The gel time measurements were made on Brookfield DV-II+ viscometer at test temperature using LV2 spindle spinning at 10 rpm.

Figure 2:
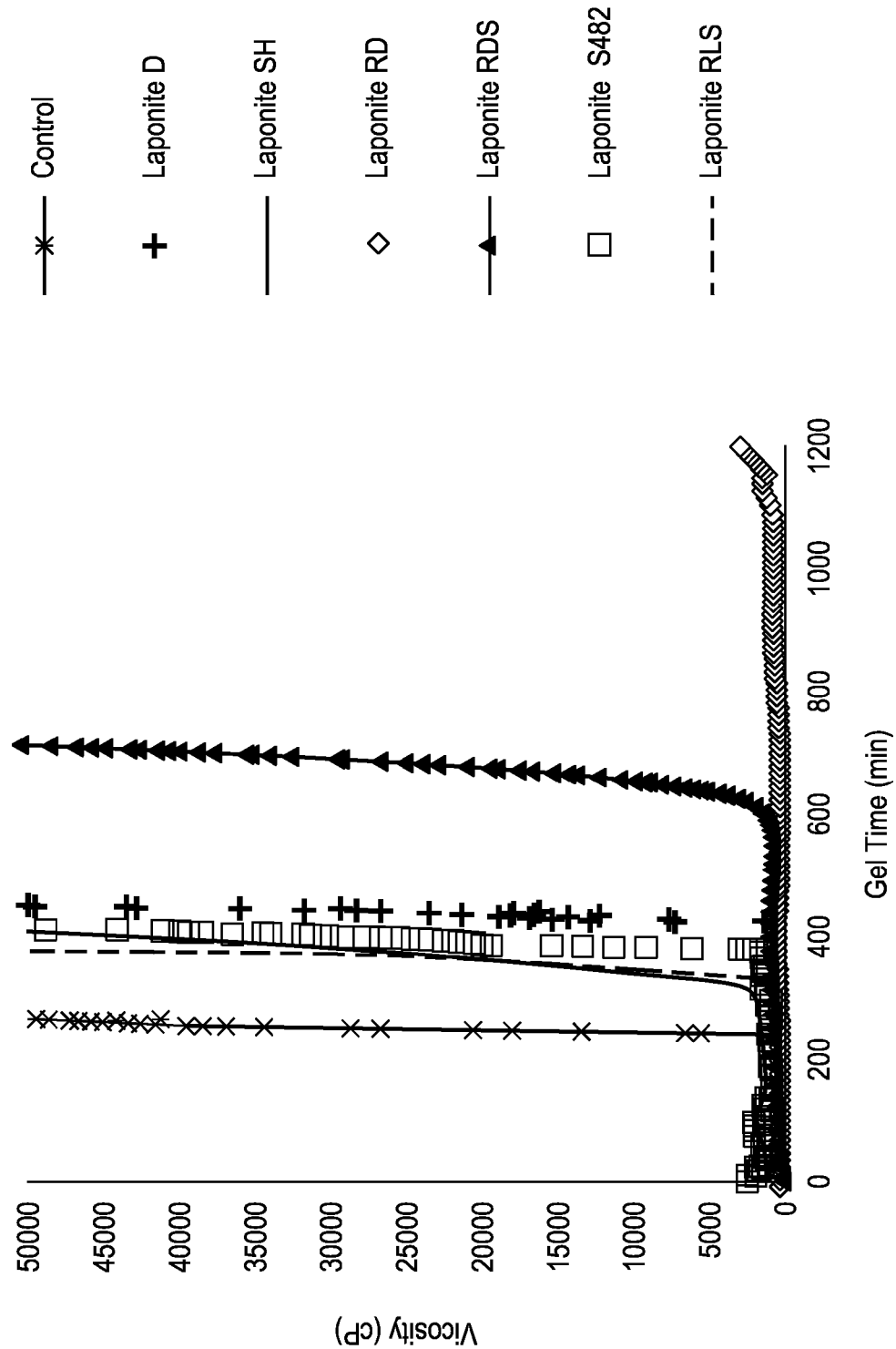
FIG. 2 provides a graph of the viscosity of each sample over time for samples of gellable treatment fluids with various laponite clays therein.

FIG. 2 provides a graph of the viscosity of each sample over time. The control sample (no laponite) gelled in about 220 minutes. The LAPONITE® RXL 7247, LAPONITE® SH, LAPONITE® S482, and LAPONITE® D gelled in about 300 to about 400 minutes. The LAPONITE® RDS gelled in about 700 minutes. The LAPONITE® RD began showing signs of gelation beginning around 1150 minutes. The analysis was conducted for only 1200 minutes. This example demonstrates that clay-based gel retarding agents can delay the gelation of a gellable treatment fluid.

Example 2

Figure 3:
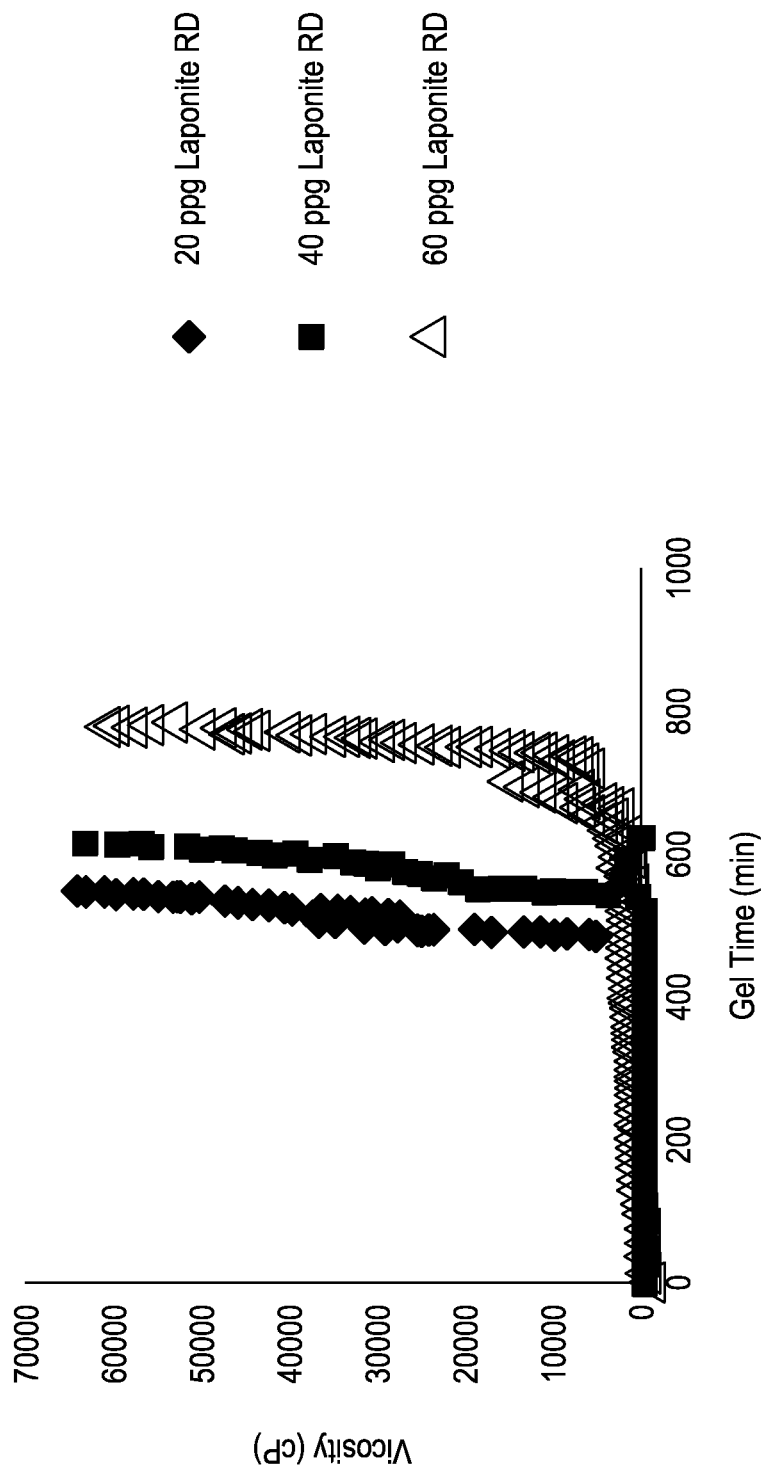
FIG. 3 provides a graph of the viscosity of each sample over time for samples with varying concentrations of a laponite clay.

Samples were prepared as described in Example 1 with LAPONITE® RD at varying concentrations: 20 pptg, 40 pptg, and 72.9 pptg. FIG. 3 provides a graph of the viscosity of each sample over time. The samples gel at about 475 min, 550 min, and 750 min for the 20 pptg, 40 pptg, and 72.9 pptg samples, respectively. This example demonstrates that the time to gelation with clay-based gel retarding agents is dependent upon concentration, where higher concentrations retard gelation to a greater degree.

Example 3

Figure 4:
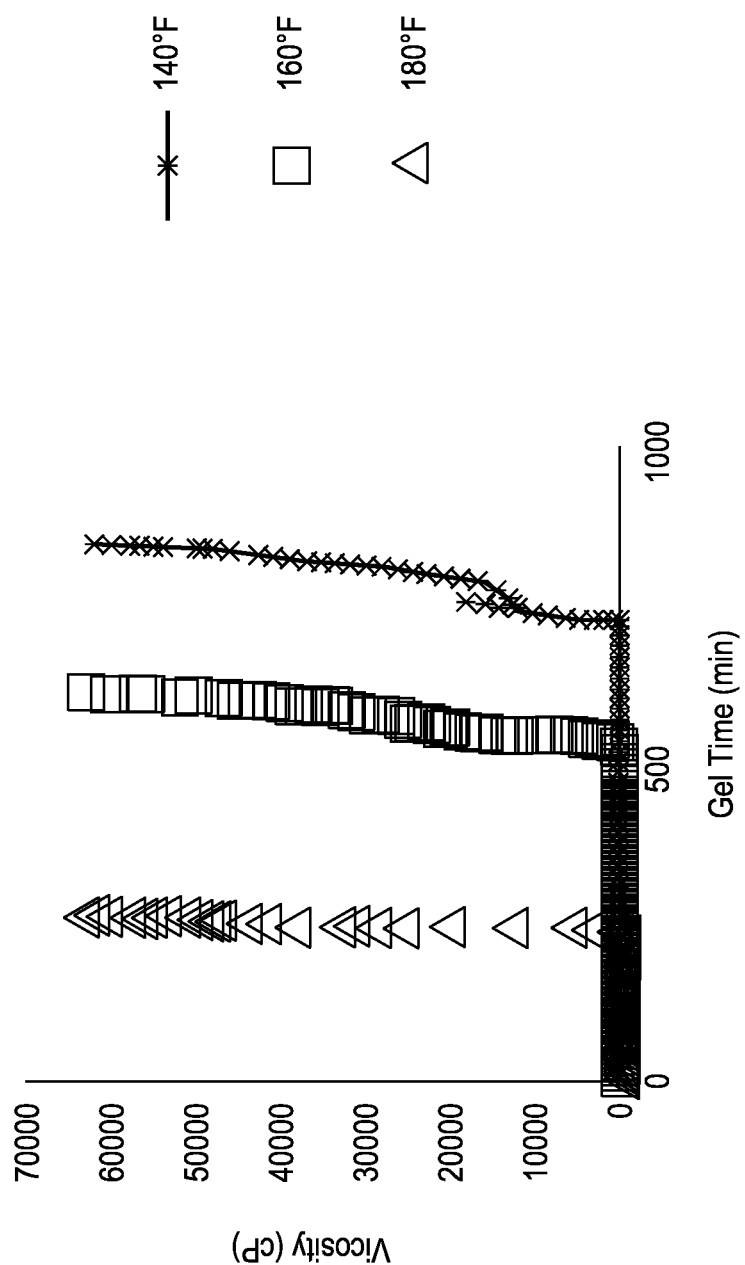
FIG. 4 provides a graph of the viscosity of each sample over time with a laponite clay therein at various temperatures.

Samples were prepared as described in Example 1 with LAPONITE® RD at 40 pptg where the samples were exposed to different temperatures: 140° F. (60° C.), 160° F. (71° C.), and 180° F. (82° C.). FIG. 4 provides a graph of the viscosity of each sample over time. The samples gel at about 750 min, 550 min, and 250 min for the 140° F. (60° C.), 160° F. (71° C.), and 180° F. (82° C.) samples, respectively. This example demonstrates that time to gelation with clay-based gel retarding agents is dependent upon temperature, where higher temperature allows for faster gelation.

Example 4

Figure 5:
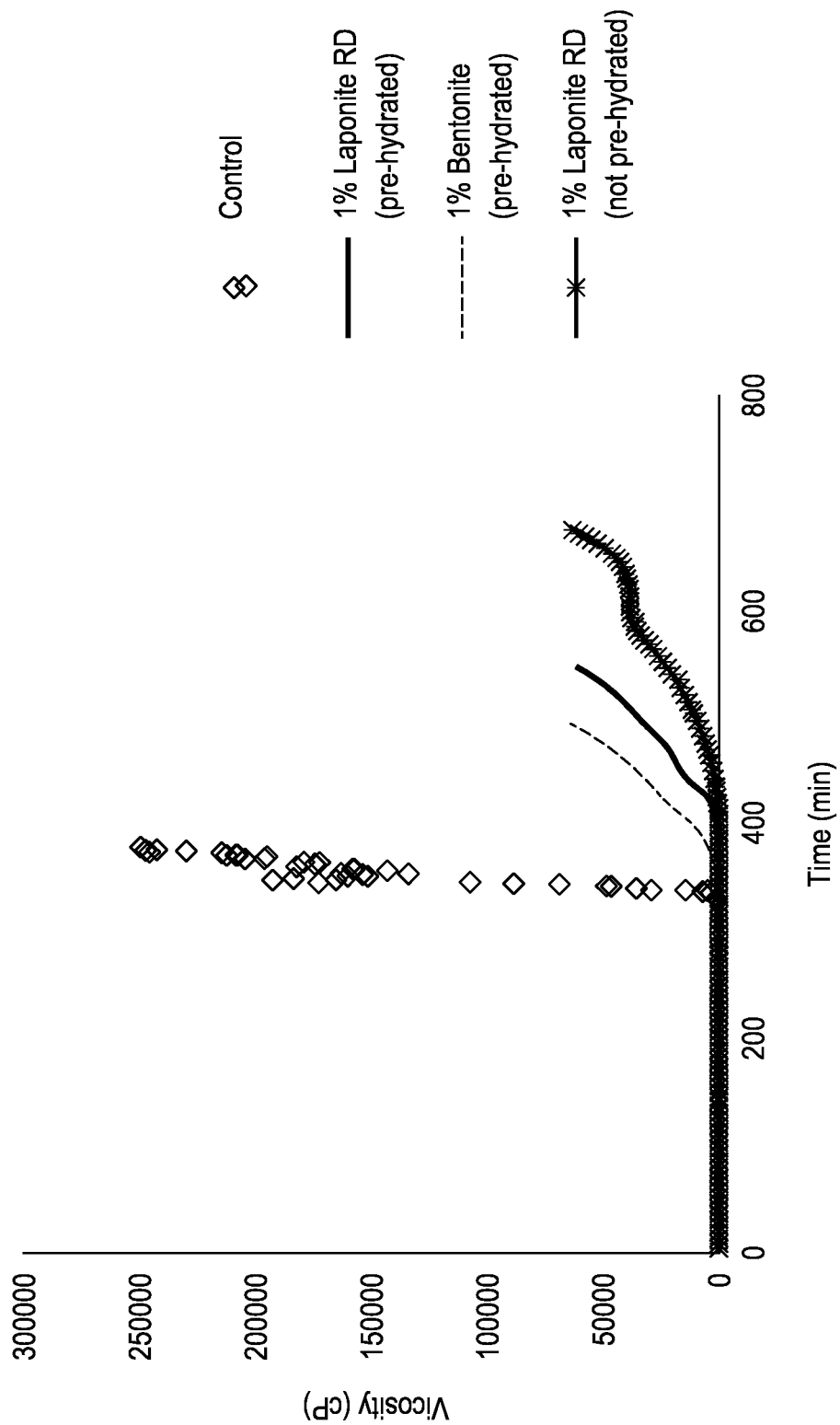
FIG. 5 provides a graph of the viscosity of each sample over time of gellable treatment fluids with various laponite clays therein optionally with pre-hydration.

Four samples were prepared as described in Example 1 (except without the addition of KCI) with t-butylacrylate-co-acrylamide and polyethyleneimine: (1) control with no clay, (2) 80 pptg LAPONITE® RD, (3) 80 pptg bentonite, and (4) 80 pptg LAPONITE® RD. The clays in samples (2) and (3) were pre-hydrated, while the clay in sample (4) was added to the water at the same time as the polymers. FIG. 5 provides a graph of the viscosity of each sample over time. The control sample begins to gel in about 325 minutes, the pre-hydrated bentonite (3) in about 375 min, the pre-hydrated LAPONITE® RD (2) in about 425 min, and the not pre-hydrated LAPONITE® RD (4) in about 450 min. Further, the rate of gelation (or increase in viscosity after gelation begins) is very sharp for the control sample and slow for the clay samples with the slowest being for the not pre-hydrated LAPONITE® RD (4).

This example demonstrates that both layered silicates and aluminosilicates are effective clay-based gel retarders. Further, this example shows that the clays do not need to be, and are sometimes, advantageously, not pre-hydrated to effectively retard gelation of the systems described herein. Additionally, as compared to Example 1, the exclusion of a salt like KCl may further extend the gel time.

The disclosure and examples provided herein demonstrate that clay-based gel retarders are effective at extending the gel time for the gelling systems described herein. Further, the clay-based gel retarders are effective (and in some instances more effective) when not pre-hydrated. Again, this is contrary to the art in that clays typically are defoliated (e.g., by pre-hydration) and produce thixotropic fluids, and when used in conjunction with gels have been described to not effect gel time.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
    providing a gellable treatment fluid comprising:
        an aqueous base fluid;
        a base polymer;
        a polymeric organic crosslinking agent comprising a crosslinkable polymer; and
        a clay-based gel retarder comprising a plurality of clay platelets, wherein the platelets have at least one surface that has been treated with a surface activity modifier that comprises one selected from the group consisting of sodium silicate, an alkaline lignosulfate, an amino alkylene phosphonate, propylene carbonate, and any combination thereof,
  wherein the clay-based gel retarder comprises at least one selected from the group consisting of a laponite, a modified laponite, and combination thereof, wherein the clay-based gel retarder is used in aggregate, not pre-hydrated, form and wherein the base polymer comprises a copolymer of acrylamide and t-butyl acrylate and the crosslinkable polymer is polyethyleneimine;
  introducing the gellable treatment fluid into a wellbore penetrating a subterranean formation; and
  forming a gel with the gellable treatment fluid in at least a portion of the wellbore, at least a portion of the subterranean formation, or both.

2. The method of claim 1, wherein providing the gellable treatment fluid involves concurrently combining the aqueous base fluid, the base polymer, the polymeric organic crosslinking agent, and a dry form of the clay-based gel retarder.

3. The method of claim 1, wherein the clay-based gel retarder comprises a plurality of clay platelets having an average diameter of about 10 nm to about 100 nm and an average thickness of about 0.5 nm to about 2 nm.

4. The method of claim 1, wherein the clay-based gel retarder comprises aggregates of a plurality of clay platelets having an average diameter of about 100 nm to about 2000 nm.

5. The method of claim 1, wherein the gellable treatment fluid further comprises a clay-activator.

6. The method of claim 1, wherein the clay-based gel retarder is present in the gellable treatment fluid in an amount of about 0.1% to about 15% by weight of the aqueous base fluid.

7. The method of claim 1, wherein the base polymer is present in the gellable treatment fluid in an amount of about 0.1% to about 10% by weight of the aqueous base fluid.

8. The method of claim 1, wherein the polymeric organic crosslinking agent is present in the gellable treatment fluid in an amount of about 0.1% to about 5% by weight of the aqueous base fluid.

9. The method of claim 1, wherein the base polymer and the polymeric organic crosslinking agent are at a relative weight ratio of about 1:2 to about 50:1.

10. The method of claim 1 further comprising:
  infiltrating a porous matrix of the subterranean formation with at least a portion of the gellable treatment fluid; and
  forming the gel in at least a portion of the porous matrix of the subterranean formation with the gellable treatment fluid.

11. The method of claim 1, wherein forming the gel is in an annulus within the wellbore.

12. The method of claim 1, wherein forming the gel is in a gravel pack, and wherein the clay-based gel retarder comprises a plurality of clay platelets having an average diameter of about 10 nm to about 100 nm and an average thickness of about 0.5 nm to about 2 nm.

13. A system comprising:
  a pump fluidly coupled to a tubular that penetrates a subterranean formation,
  wherein the tubular contains a gellable treatment fluid that comprises
    an aqueous base fluid;
    a base polymer;
    a polymeric organic crosslinking agent comprising a crosslinkable polymer; and
    a clay-based gel retarder comprising a plurality of clay platelets, wherein the platelets have at least one surface that has been treated with a surface activity modifier that comprises one selected from the group consisting of sodium silicate, an alkaline lignosulfate, an amino alkylene phosphonate, propylene carbonate, and any combination thereof;
    wherein the clay-based gel retarder comprises at least one selected from the group consisting of a laponite, a modified laponite, and combination thereof, wherein the clay-based gel retarder is used in aggregate, not pre-hydrated, form and wherein the base polymer comprises a copolymer of acrylamide and t-butyl acrylate and the crosslinkable polymer is polyethyleneimine.

14. A method comprising:
providing a gellable treatment fluid comprising:
  an aqueous base fluid;
  a base polymer;
  a polymeric organic crosslinking agent comprising a crosslinkable polymer; and
  a clay-based gel retarder that comprises a plurality of clay platelets having an average diameter of about 10 nm to about 100 nm and an average thickness of about 0.5 nm to about 2 nm and, wherein the platelets have at least one surface that has been treated with a surface activity modifier that comprises one selected from the group consisting of sodium silicate, an alkaline lignosulfate, an amino alkylene phosphonate, propylene carbonate, and any combination thereof;
  wherein the clay-based gel retarder comprises at least one selected from the group consisting of a laponite, a modified laponite, and combination thereof, wherein the clay-based gel retarder is used in aggregate, not pre-hydrated, form and wherein the base polymer comprises a copolymer of acrylamide and t-butyl acrylate and the crosslinkable polymer is polyethyleneimine;
introducing the gellable treatment fluid into a wellbore penetrating a subterranean formation, the subterranean formation comprising a porous matrix;
infiltrating at least a portion of the porous matrix of the subterranean formation with the gellable treatment fluid; and
forming a gel in the porous matrix of the subterranean formation with the gellable treatment fluid.

15. A method comprising:
providing a gellable treatment fluid by concurrently combining an aqueous base fluid, a base polymer, a polymeric organic crosslinking agent comprising a crosslinkable polymer, and a dry form of a clay-based gel retarder,
wherein the clay-based gel retarder comprises (1) at least one selected from the group consisting of a laponite, a modified laponite, a natural hectorite, a montmorillonite, a sapiolite, and any combination thereof and (2) a plurality of clay platelets, wherein the platelets have at least one surface that has been treated with a surface activity modifier that comprises one selected from the group consisting of sodium silicate, an alkaline lignosulfate, an amino alkylene phosphonate, propylene carbonate, and any combination thereof;
  wherein the clay-based gel retarder comprises at least one selected from the group consisting of a laponite, a modified laponite, and combination thereof, wherein the clay-based gel retarder is used in aggregate, not pre-hydrated, form and wherein the base polymer comprises a copolymer of acrylamide and t-butyl acrylate and the crosslinkable polymer is polyethyleneimine;

introducing the gellable treatment fluid into a wellbore penetrating a subterranean formation; and forming a gel with the gellable treatment fluid in at least a portion of the wellbore, at least a portion of the subterranean formation, or both.

* * * * *